(12) United States Patent
Hirano et al.

(10) Patent No.: US 10,162,509 B2
(45) Date of Patent: Dec. 25, 2018

(54) TERMINAL DEVICE

(71) Applicant: Sharp Kabushiki Kaisha, Sakai, Osaka (JP)

(72) Inventors: Yuhsuke Hirano, Sakai (JP); Takao Oku, Sakai (JP); Tadao Andoh, Sakai (JP); Yuhji Maejima, Sakai (JP); Katsuya Demoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/528,526

(22) PCT Filed: Jan. 6, 2016

(86) PCT No.: PCT/JP2016/050195
§ 371 (c)(1),
(2) Date: May 22, 2017

(87) PCT Pub. No.: WO2016/114185
PCT Pub. Date: Jul. 21, 2016

(65) Prior Publication Data
US 2017/0255358 A1 Sep. 7, 2017

(30) Foreign Application Priority Data
Jan. 16, 2015 (JP) ................. 2015-006927

(51) Int. Cl.
*G06F 3/023* (2006.01)
*G06F 3/0487* (2013.01)
(Continued)

(52) U.S. Cl.
CPC ............ *G06F 3/0487* (2013.01); *G06F 3/023* (2013.01); *G06F 3/038* (2013.01); *G06F 3/0489* (2013.01);
(Continued)

(58) Field of Classification Search
CPC ....... G06F 21/34; G06F 3/0487; G06F 3/0489
(Continued)

(56) References Cited

U.S. PATENT DOCUMENTS

2007/0005607 A1* 1/2007 Fukuta ..................... G06F 9/452
2007/0266310 A1* 11/2007 Sasaki ..................... G06F 3/002
709/203

(Continued)

FOREIGN PATENT DOCUMENTS

JP 2001-142595 A 5/2001
JP 2014-115845 A 6/2014

*Primary Examiner* — Timothy Pham
(74) *Attorney, Agent, or Firm* — Keating & Bennett, LLP

(57) ABSTRACT

Provided is a terminal device (i) in which an application for a touch panel terminal is usable and (ii) which includes a hardware key. A process carried out by the terminal device includes the steps of: detecting an operation to the hardware key (S1310); in a case where a focus is displayed on a location of a user interface image (i.e., YES in step S1330) and the operation is an operation for making a determination (YES in step S1340), accepting an input of a command associated with the user interface image (S1350); and in a case where the operation is not the operation for making a determination (NO in step S1340) and the terminal device has determined that the operation is an operation conducted, to the hard key, for moving a user interface image (YES in step S1360), moving the focus to a next user interface image (S1370).

1 Claim, 13 Drawing Sheets

(51) Int. Cl.
*G06F 3/0489* (2013.01)
*G06F 3/038* (2013.01)
*G06F 3/0488* (2013.01)
*G06F 3/0484* (2013.01)
*G06F 21/34* (2013.01)

(52) U.S. Cl.
CPC ...... *G06F 3/04842* (2013.01); *G06F 3/04886* (2013.01); *G06F 3/04892* (2013.01); *G06F 21/34* (2013.01)

(58) Field of Classification Search
USPC ...................................................... 455/422.1
See application file for complete search history.

(56) References Cited

U.S. PATENT DOCUMENTS

| | | | |
|---|---|---|---|
| 2012/0030604 A1* | 2/2012 | Kim | G06F 3/04886 715/773 |
| 2012/0235921 A1* | 9/2012 | Laubach | G06F 3/0238 345/172 |
| 2015/0012871 A1* | 1/2015 | Laubach | G06F 3/0238 715/773 |
| 2015/0205393 A1* | 7/2015 | Smus | G06F 3/041 345/173 |
| 2015/0317043 A1 | 11/2015 | Hayashi et al. | |

* cited by examiner (A)

(B)

TERMINAL DEVICE

TECHNICAL FIELD

The present disclosure relates to a terminal device. More specifically, the present disclosure relates to control of a terminal device including a hardware key.

BACKGROUND ART

In recent years, a mobile information terminal has increased in speed of a central processing unit (CPU) and in communication speed, and this causes an increase in amount of information to be handled by the mobile information terminal. Furthermore, due to reduction in cost for various devices (e.g., a memory) necessary for processing information in such an amount, a display typified by a liquid crystal display and an organic electro luminescence (EL) display tend to be increased in size. This allows many pieces of information to be simultaneously displayed on a screen of the display.

A conventional mobile phone has many hardware keys such as a dial key. However, a mobile phone has come to have a large-sized display, so as to be able to display a user interface (UI) component in a large size allowing a user to conduct an operation by directly touching the UI component. In order to increase a size of a display without causing a problem in size of a terminal including the display, the mainstream of terminals is a terminal in which (i) a hardware key is eliminated as much as possible and (ii) a display (touch panel) to which an operation function is imparted is employed as a display. In recent years, therefore, an increasing number of applications are compliant with only a touch operation and are not compliant with a key input.

However, there are still users who prefer a small-sized terminal. Users (e.g., senior users) who feel it difficult to conduct a touch operation still have a high demand for using an application by conducting a conventional key input operation. Such users cannot use an application which is compliant with only a touch operation. Providers of applications have a problem that in order to address such a situation, burden of developing software for addressing an operation conducted with respect to a hardware key is increased.

In regard to a key input, for example, the Japanese Patent Application Publication, Tokukai, No. 2001-142595 (Patent Literature 1) discloses a key input device for "enabling an operation conducted via a mouse, a pointing device, and a touch panel by using only a keyboard". Specifically, according to the key input device, "an input section 2 is constituted by a keyboard including a character key, a conversion key, and a selection key. In a case where the character key is operated so that a character string is inputted, and then a conversion key is operated, a CPU 1 stores the character string in an RAM 3. The CPU 1 then controls a display section 6 to display a plurality of candidates for conversion which candidates correspond to the character string thus inputted, from a conversion dictionary storing therein (i) a candidate for a converted character string into which the character string thus inputted has been converted and (ii) a plurality of candidates for conversion including a predetermined command candidate. In a case where a command candidate has been selected by an operation conducted with respect to the selection key, the CPU 1 carries out a command process based on the command candidate. If necessary, a document prepared by performing the command process is written into a storage medium 5 by a storage device 4, printed by a printing section 7, and then transmitted from a transmission control section 8." (see "Abstract").

CITATION LIST

Patent Literature

[Patent Literature 1]
Japanese Patent Application Publication, Tokukai, No. 2001-142595

SUMMARY OF INVENTION

Technical Problem

According to the technique disclosed in the Japanese Patent Application Publication, Tokukai, No. 2001-142595, however, each application needs to be compliant with a command corresponding to a touch operation. Accordingly, burden of developing each application cannot be reduced.

Furthermore, an operation of the key input device depends on implementation of an application. Therefore, an operation conducted with respect to a key which is associated with a command varies depending on each application. This may confuse a user and also deteriorate convenience.

As such, there has been a demand for a technique for using, in a terminal device including a hardware key, an application developed for a touch panel terminal. Furthermore, there has been a demand for a technique, without deteriorating convenience, for using, in a terminal device including a hardware key, an application developed for a touch panel terminal.

The present disclosure has been accomplished in order to solve the problems. An object in an aspect of the present invention is to provide a terminal device (i) in which an application developed for a touch panel terminal is usable and (ii) which includes a hardware key.

An object in another aspect of the present invention is to provide, without deteriorating convenience, a terminal device (i) in which an application developed for a touch panel terminal is usable and (ii) which includes a hardware key.

An object in still another aspect of the present invention is to provide a program for controlling a terminal device including a hardware key so that an application developed for a touch panel terminal is usable in the terminal device.

An object in a further aspect of the present invention is to provide, without deteriorating convenience, a program for controlling a terminal device including a hardware key so that an application developed for a touch panel terminal is usable in the terminal device.

Solution to Problem

A terminal device in accordance with an embodiment of the present invention includes: one or more operation keys configured to accept a command which is inputted to the terminal device; a memory for storing therein an application configured to be executed in accordance with an operation conducted with respect to a touch panel in an electronic device; a monitor configured to display one or more user interface images and a focus in a case where the application is executed by the electronic device, the one or more user interface images each being configured to accept, via the touch panel, a command to the application, the focus being used to accept an operation of determining a selection of one of the one or more user interface images; and a control section configured to control an operation of the terminal device.

The monitor displays a first user interface image and a second user interface image. The control section is configured such that, in a case where the focus is associated with the first user interface image, the control section associates the focus with the second user interface image in accordance with a first operation conducted with respect to one of the one or more operation keys.

The control section is preferably configured to determine, in accordance with a second operation conducted with respect to one of the one or more operation keys, a selection of the second user interface image which selection has been made with use of the focus.

The control section is preferably configured such that, in a case where the focus is associated with the second user interface image, the control section associates the focus with the first user interface image in accordance with the first operation conducted with respect to one of the one or more operation keys.

The one or more operation keys preferably include a key configured to move a cursor.

Another embodiment of the present invention provides a program for controlling a terminal device. The terminal device includes: one or more operation keys configured to accept a command which is inputted to the terminal device; a memory for storing therein an application configured to be executed in accordance with an operation conducted with respect to a touch panel in an electronic device; a monitor configured to display one or more user interface images and a focus in a case where the application is executed by the electronic device, the one or more user interface images each being configured to accept, via the touch panel, a command to the application, the focus being used to accept an operation of determining a selection of one of the one or more user interface images; and a processor for controlling an operation of the terminal device. The program causes the processor to execute the following steps of: (a) displaying a first user interface image and a second user interface image on the monitor and (b) associating, by the control section, the focus with the second user interface image in accordance with a first operation conducted with respect to one of the one or more operation keys, in a case where the focus is associated with the first user interface image.

Advantageous Effects of Invention

In an aspect of the present invention, it is possible to use, in a terminal device including a hardware key, an application which has been developed for a touch panel terminal.

In another aspect of the present invention, it is possible to use, without deteriorating convenience, in a terminal device including a hardware key, an application which has been developed for a touch panel terminal.

The foregoing objects, features, aspects, and advantages and other objects, features, aspects, and advantages of the present invention will be revealed from the following detailed descriptions which relate to the present invention and are understood with reference to the accompanying drawings.

DESCRIPTION OF EMBODIMENTS

Figure 1:
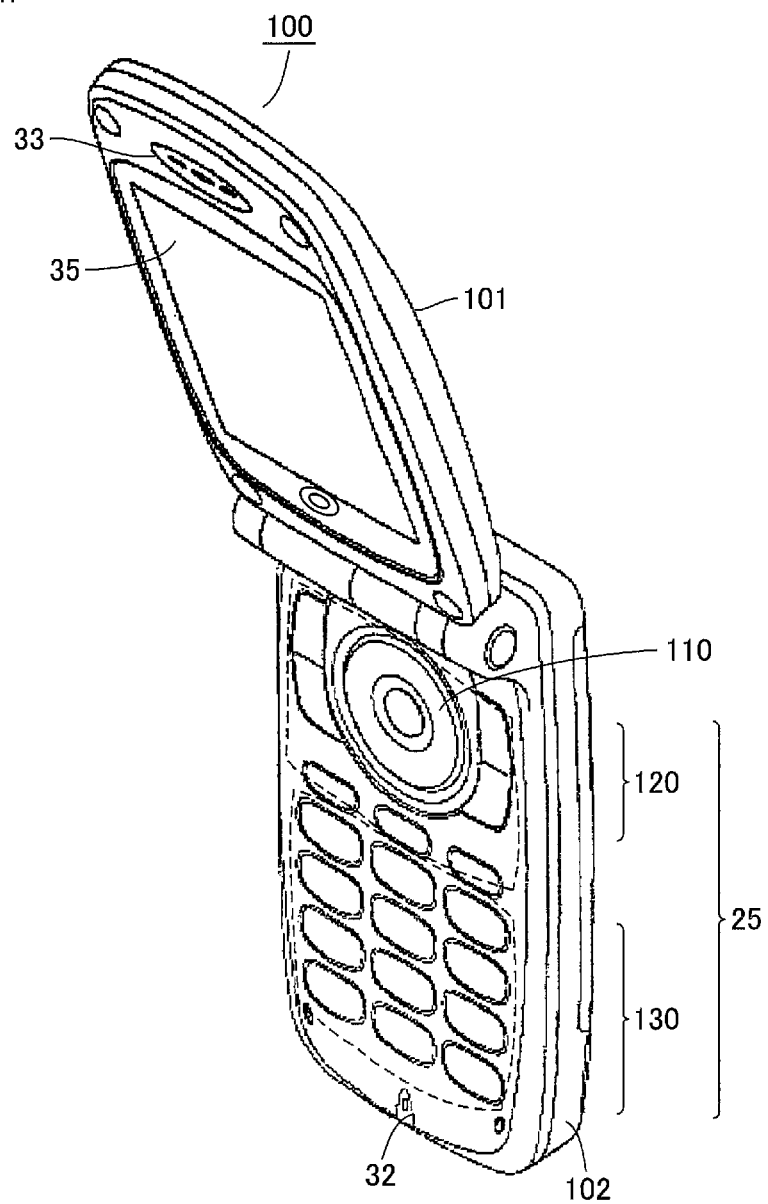
FIG. 1 is a view illustrating an appearance of a mobile phone 100.

The following description will discuss embodiments of the present invention with reference to drawings. In the following description, identical components having identical names and functions are given respective identical reference numerals. Therefore, a detailed description of such components will not be repeated.

[Technical Idea]

The following description will first discuss a technical idea in accordance with the present disclosure. The technical idea is summarized as follows. Specifically, in a case of an application compliant with only a touch event, an operation is enabled by converting an operation conducted with respect to a hardware key (hereinafter also referred to as a "key event") into a touch event (an operation conducted with respect to a touch panel). For example, a terminal device, which includes (i) a hardware key and (ii) a processor, carries out a process as below. Examples of the terminal device can include a mobile phone and a handy-type information processing terminal.

[Key Event Addressing Determination Process]

(1) A terminal device has a memory built-in, in which memory an application compliant with only a touch event is stored in advance.

(2) In a case where an application window is activated, a processor of the terminal device (i) checks whether an application which has activated application window is compliant with a key event and then (ii) stores, in the memory, a check result (information indicative of whether the application is compliant with a key event).

(3A) In a case where (i) a key event is inputted and (ii) the processor determines that the application of a displayed window is not compliant with a key event, the processor convers the key event into a touch event so as to discard the key event.

(3B) Meanwhile, in a case where (i) a key event is inputted and (ii) the processor determines that the application of a displayed window is compliant with a key event, the processor leaves the key event as it is.

[Conversion Process of Converting Key Event into Touch Event]

(1) The processor determines, on the basis of an output signal supplied from a hardware key, whether a key event is based on (i) an operation with respect to a determination key, (ii) an operation with respect to a cross key, or (iii) an operation with respect to another key.

(2) For example, in a case where the key event is determined to be based on the operation with respect to the cross key, the processor first determines whether a UI component is currently focused.

(3) In a case where the UI component is determined to be currently focused, the processor determines a UI component which is to be subsequently focused. Note that, in Embodiment 1, "a UI component is focused" indicates a state or display which indicates that the UI component has been a candidate for selection.

(4) In a case where a key event is based on an operation conducted with respect to a left key or a right key, the processor determines, as the UI component which is to be subsequently focused, a UI component which is adjacent to the UI component currently focused. For example, in a case where a left side key is pressed, a UI component which is located on the left of the UI component currently focused is selected. In a case where a right side key is pressed, a UI component which is located on the right of the UI component currently focused is selected.

(5) In a case where the key event is based on an operation conducted with respect to an up key or a down key, the processor determines, as the UI component which is to be subsequently focused, one of UI components which are adjacent to the UI component currently focused, which one has center coordinates with the shortest distance from the center coordinates of the UI component currently focused.

<Embodiment 1>

[Configuration]

The following description will discuss, with reference to FIG. 1, a configuration of a mobile phone 100 in accordance with Embodiment 1. FIG. 1 is a view illustrating an appearance of the mobile phone 100. The following description will describe the mobile phone 100 as an example terminal device. Note, however, that the application of a technical idea in accordance with Embodiment 1 is not limited to a mobile phone.

The mobile phone 100 includes housings 101 and 102, a hardware key 25, a microphone 32, a loudspeaker 33, and a display 35. The hardware key 25 includes a cursor movement key 120, a determination key 110, and a numeric key 130.

Figure 2:
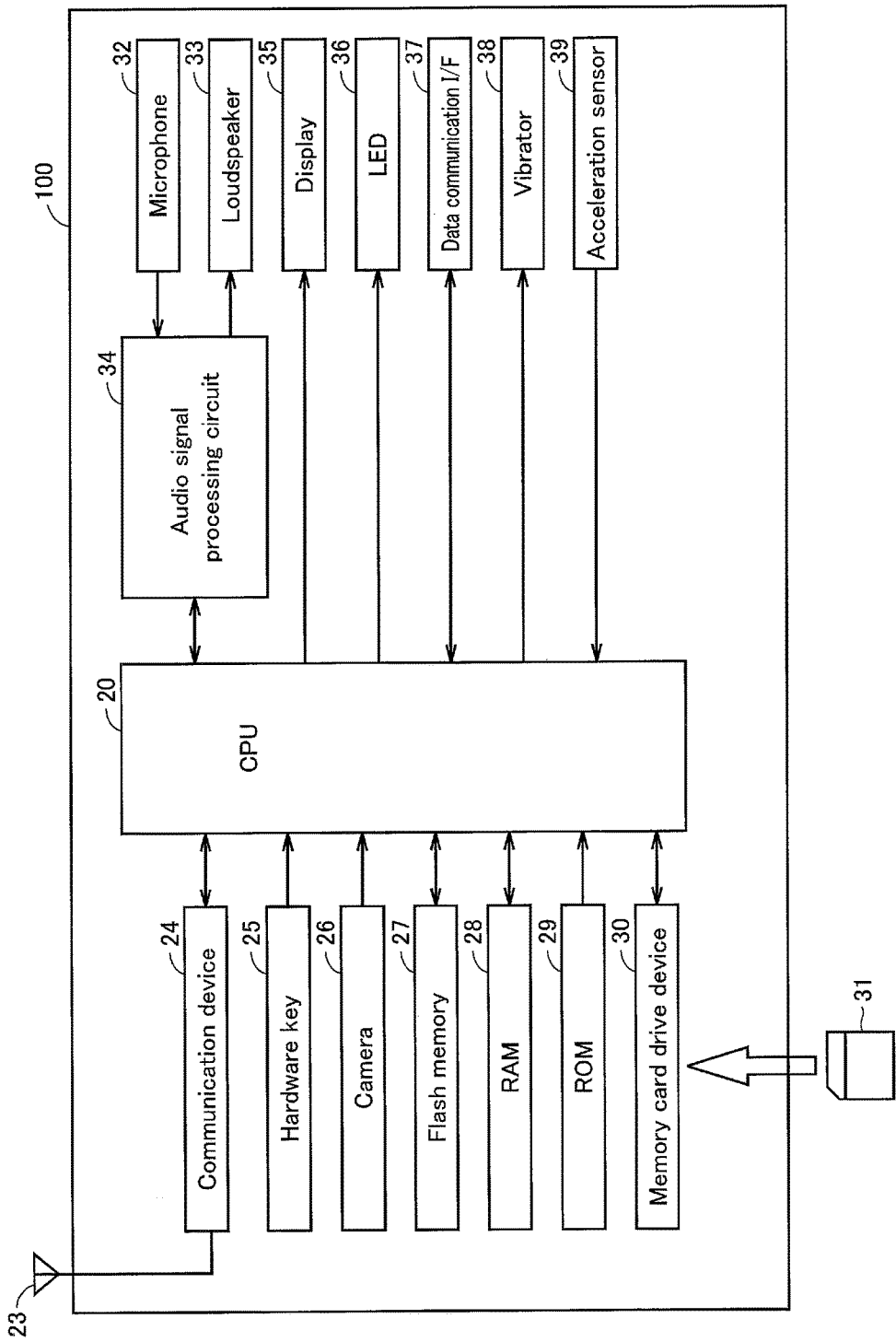
FIG. 2 is a block diagram illustrating a hardware configuration of the mobile phone 100.

The following description will further discuss the configuration of the mobile phone 100 with reference to FIG. 2. FIG. 2 is a block diagram illustrating a hardware configuration of the mobile phone 100.

The mobile phone 100 includes a CPU 20, an antenna 23, a communication device 24, the hardware key 25, a camera 26, a flash memory 27, a random access memory (RAM) 28, a read only memory (ROM) 29, a memory card drive device 30, the microphone 32, the loudspeaker 33, an audio signal processing circuit 34, the display 35, a light emitting diode (LED) 36, a data communication I/F 37, a vibrator 38, and an acceleration sensor 39. A memory card 31 can be loaded in the memory card drive device 30.

Through the antenna 23, (i) a signal transmitted from a base station is received or (ii) a signal for communicating with another communication device is transmitted via the base station. A signal received via the antenna 23 is subjected to a front end process which is carried out by the communication device 24. The signal subjected to the front end process is then transmitted to the CPU 20.

The hardware key 25 accepts an operation which is conducted with respect to the mobile phone 100. The hardware key 25 includes keys such as a determination key, a cross key, a numeric key, and another key. In a case where the hardware key 25 accepts an operation, the hardware key 25 transmits, to the CPU 20, a signal which varies in accordance with a current operation mode of the mobile phone 100.

The CPU 20, on the basis of a command given to the mobile phone 100, carries out a process for controlling an operation of the mobile phone 100. In a case where the mobile phone 100 receives a signal, the CPU 20 carries out a predetermined process on the basis of a signal received from the communication device 24. The CPU 20 then transmits, to the audio signal processing circuit 34, the signal which has been subjected to the predetermined process. The audio signal processing circuit 34 carries out a predetermined signal process with respect to the signal, and then transmits, to the loudspeaker 33, the signal which has been subjected to the predetermined process. The loudspeaker 33 outputs a sound on the basis of the signal.

The microphone 32 accepts an utterance carried out with respect to the mobile phone 100, and then transmits, to the audio signal processing circuit 34, a signal corresponding to a voice thus uttered. The audio signal processing circuit 34 carries out, on the basis of the signal, a predetermined process for a telephone call, and then transmits, to the CPU 20, the signal which has been subjected to the predetermined process. The signal is converted by the CPU 20 into data to be transmitted, and then the CPU 20 transmits, to the communication device 24, the data thus converted. The communication device 24 generates a signal to be transmitted with use of the data, and then transmits the signal to the antenna 23.

The flash memory 27 stores therein data received from the CPU 20. The CPU 20 reads out the data from the flash memory 27, and then carries out a predetermined process with use of the data thus read out.

The RAM 28 temporarily stores therein data generated by the CPU 20 on the basis of an operation conducted with respect to the hardware key 25. The ROM 29 stores therein a program and/or data for causing the mobile phone 100 to conduct a predetermined operation. The CPU 20 reads out the program or the data from the ROM 29, and then controls an operation of the mobile phone 100 based on the program or the data thus read out.

The memory card drive device 30 reads out data from the memory card 31, and then transmits the data to the CPU 20. The memory card drive device 30 writes, into a free space of the memory card 31, data supplied from the CPU 20.

The audio signal processing circuit 34 carries out a signal process for the telephone call as described above. The example illustrated in FIG. 2 illustrates that the CPU 20 and the audio signal processing circuit 34 are provided as separate members. Note, however, that in another aspect of Embodiment 1, the CPU and the audio signal processing circuit 34 can be monolithically formed.

The display 35 is realized by, for example, a liquid crystal display (LCD) or an organic electro luminescence (EL) display. The display 35 can be, for example, a capacitive touch panel display, and a mechanism of a touch panel is not limited to a particular one. The display 35 displays, on the basis of data obtained from the CPU 20, an image defined by the data. For example, the display 35 displays an image based on an application program which is being executed by the CPU 20. Examples of the application program include applications such as a game and social network service (SNS).

The LED 36 conducts a predetermined light emitting operation on the basis of a signal supplied from the CPU 20. A connection of a cable for data communication is accepted via the data communication I/F 37.

The CPU 20 transmits to the cable a signal, via the data communication I/F 37. Alternatively, data received via the cable can be transmitted to the CPU 20, via the data communication I/F 37.

The vibrator 38 conducts, on the basis of a signal supplied from the CPU 20, a vibrating operation at a predetermined frequency.

The acceleration sensor 39 detects a direction of acceleration acted on the mobile phone 100. A detection result is supplied to the CPU 20.

(1) In an aspect of Embodiment 1, the hardware key 25 is provided in the housing 102 of the mobile phone 100 so as to accept an input command to the mobile phone 100. The flash memory 27 stores therein an application which is configured to execute in accordance with an operation conducted with respect to a touch panel included in an electronic device. Examples of the electronic device include a smartphone, a tablet terminal, a touch operation personal computer, and a wearable device (e.g., a watch type). The display 35 is configured to display (i) one or more user interface images which are configured to accept, via a touch panel, a command to the application and (ii) a focus for accepting an operation for determining a selection of one of the one or more user interface images, in a case where an application is executed by an electronic device. The CPU 20 is configured to execute a command and control an operation of the mobile phone 100 on the basis of an operation conducted by a user. The display 35 displays a first user interface image and a second user interface image. The CPU 20 is configured to associate the focus with the second user interface image in accordance with a first operation (e.g., pressing of a key) conducted with respect to one of keys of the hardware key 25, in a case where the focus has been associated with the first user interface image.

(2) In another aspect of Embodiment 1, the CPU 20 is configured to determine a selection, made by the focus, of the second user interface image in accordance with a second operation (e.g., pressing of a key) conducted with respect to one of the keys of the hardware key 25.

(3) In still another aspect of Embodiment 1, the CPU 20 is preferably configured to associate the focus with the first user interface image in accordance with the first operation conducted with respect to one of the keys of the hardware key 25, in a case where the focus has been associated with the second user interface image.

(4) The hardware key 25 includes the left and right keys, the up and down keys, and the cross key each of which causes a cursor to move. In a further aspect of Embodiment 1, in numeric keys provided in a 3×3 matrix, (i) a numeric button provided in a center of an upper row of the matrix can function as an up key, (ii) a numeric button provided in a center of a lower row of the matrix can function as a down key, (iii) a numeric button provided in a center of a right column of the matrix can function as a right key, and (iv) a numeric button provided in a center of a left column of the matrix can function as a left key. A numeric button provided in a center of the matrix can function as a determination key for determining a selection.

[Function Configuration]

Figure 3:
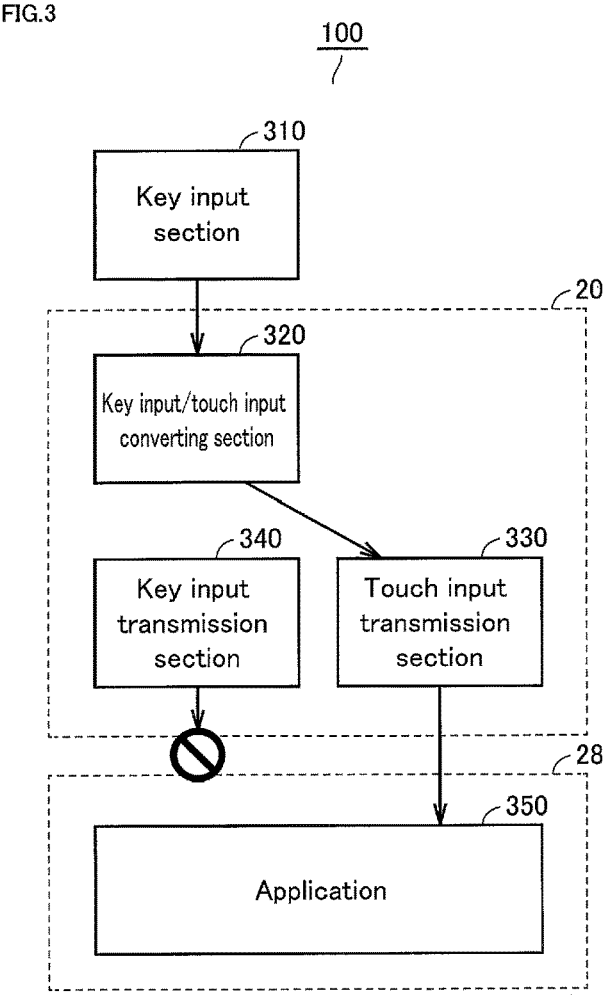
FIG. 3 is a block diagram illustrating a configuration of a function realized by the mobile phone 100.

The following description will further discuss, with reference to FIG. 3, the configuration of the mobile phone 100 in accordance with Embodiment 1. FIG. 3 is a block diagram illustrating a configuration of a function realized by the mobile phone 100. The mobile phone 100 includes a key input section 310, a key input/touch input converting section 320, a touch input transmission section 330, a key input transmission section 340, and an application 350. The key input/touch input converting section 320, the touch input transmission section 330, and the key input transmission section 340 are each realized by, for example, the CPU 20. The application 350 is stored, for example, in the RAM 28.

The key input section 310 is configured to accept an input of a command to the mobile phone 100. The key input section 310 is realized by, for example, the hardware key 25.

The key input/touch input converting section 320 is configure to convert, into an operation with respect to a touch panel, an operation which was conducted with respect to the hardware key 25 and which has been accepted by the key input section 310. How a conversion is made will be later described.

The touch input transmission section 330 is configured to transmit, to the application 350, a command to the touch panel which command has been supplied from the key input/touch input converting section 320.

The key input transmission section 340 is configured to transmit, to the application 350 as a command to the mobile phone 100, a key operation which (i) was conducted with respect to the hardware key 25 and (ii) has been accepted by the key input section 310. Note, here, that in a case where an application program, configured to be applied to an electronic device which includes a touch panel, is being executed, an output from the key input transmission section 340 is not inputted into the application program.

Figure 4:
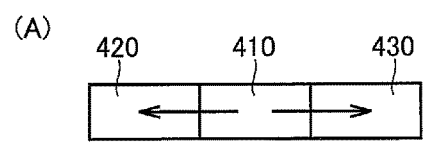
FIG. 4 is a view illustrating how a focus 410 which is displayed on a display 35 moves.
Figure 4:
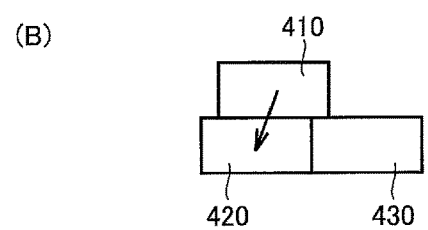

The following description will discuss, with reference to FIG. 4, the technical idea in accordance with Embodiment 1. FIG. 4 is a view illustrating how a focus 410, which is to be displayed by the display 35, is moved.

In an aspect of Embodiment 1, the focus 410 can move leftward or rightward in accordance with an input operation which is conducted by a user with respect to the hardware key 25 (see (A) of FIG. 4). For example, in a case where a user instructs the focus 410 to move rightward by operating the cursor movement key 120, the focus 410 displayed by the display 35 is moved to a location of a user interface image 430 which is displayed on the right of the focus 410. In another aspect of Embodiment 1, in a case where a user presses a left side of the cursor movement key 120, the focus 410 is moved to a location of a user interface image 420.

In still another aspect of Embodiment 1, in a case where a user presses a lower side of the cursor movement key 120, the focus 410 is moved to a location of a user interface image 420 whose distance from the focus 410 is nearest (see (B) of FIG. 4). Note that, for example, a distance between centroids of the respective images is employed as the above distance. Instead, points other than the centroids can be employed.

Note that, in Embodiment 1, the focus refers to an image which is displayed to select a user interface image to be displayed on the display 35. In another aspect of Embodiment 1, a focus and a user interface image do not need to be separately displayed. For example, in a case where a first user interface image is displayed in a manner different from that of a second user interface image, the first user interface image can be construed as being focused.

The following description will further discuss, with reference to FIGS. 5 through FIG. 11, how a focus is moved in the mobile phone 100 in accordance with Embodiment 1. FIGS. 5 through 11 are each a view illustrating how a focus is moved with respect to one or more user interface images 501 through 506 displayed on the display 35. The CPU 20 assigns numbers to respective user interface images (the user interface images 501, 502, 503, 504, 505, and 506) which are displayed on the display 35 (see FIG. 5). In an example illustrated in FIG. 5, on the basis of a fact that the number of user interface images displayed on the display 35 is six, the CPU 20 assigns numbers "1" through "6" to the respective user interface images in accordance with a predetermined assignment rule. The CPU 20 controls the focus to move in accordance with the numbers assigned to the respective user interface images, in a case where a rightward movement key or a leftward movement key of the cursor movement key 120 is pressed. For example, in a case where the rightward movement key of the cursor movement key 120 is pressed, the CPU 20 determines, within a range of the numbers assigned to respective user interface images, that a subsequent number should be employed as the number of the user interface image where a focus is to be next displayed. For example, in a case where (i) a focus is being displayed on a location of a user interface image to which the number "1" is assigned and (ii) the rightward movement key is pressed, the CPU 20 controls the focus to move to a location of a user interface image to which the number "2", which is subsequent to the number "1", has been assigned. Note, however, that in a case where the rightward movement key is pressed while a focus is being displayed on a location of a user interface image to which a largest number is assigned, the CPU 20 controls the focus to move to a location of a user interface image to which the first one of numbers assigned to respective user interface images is assigned. For example, in a case where (i) the numbers ranging "1" through "6" are assigned to respective user interface images and (ii) the rightward movement key is pressed while a focus is displayed on a location of the user interface image to which the number "6" is assigned, the CPU 20 controls the focus to move to a location of the user interface image to which the number "1" is assigned. Note that, for example, in a case where the leftward movement key of the cursor movement key 120 is pressed, the CPU 20 determines, within the range of numbers assigned to respective user interface images, that a preceding number should be employed as the number of the user interface image where the focus is to be next displayed.

Figure 5:
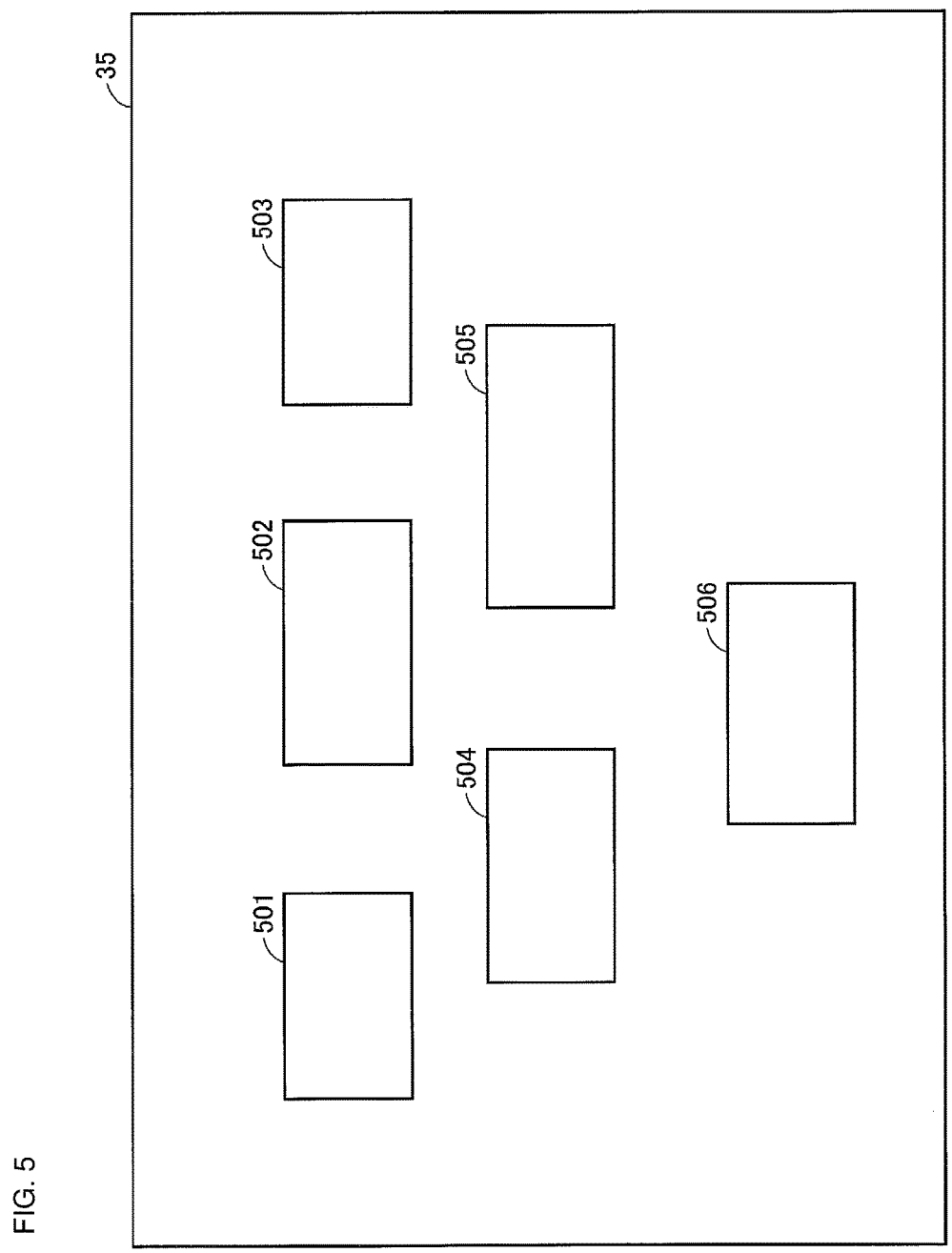
FIG. 5 is a (first) view illustrating how a focus is moved with respect to one or more user interface images 501 through 506 displayed on the display 35.

In an aspect of Embodiment 1, the display 35 displays the user interface images 501 through 506 (see FIG. 5). The CPU 20 assigns, in accordance with the predetermined assignment rule (later described), the numbers "1" through "6" to the user interface images 501 through 506, respectively.

Figure 6:
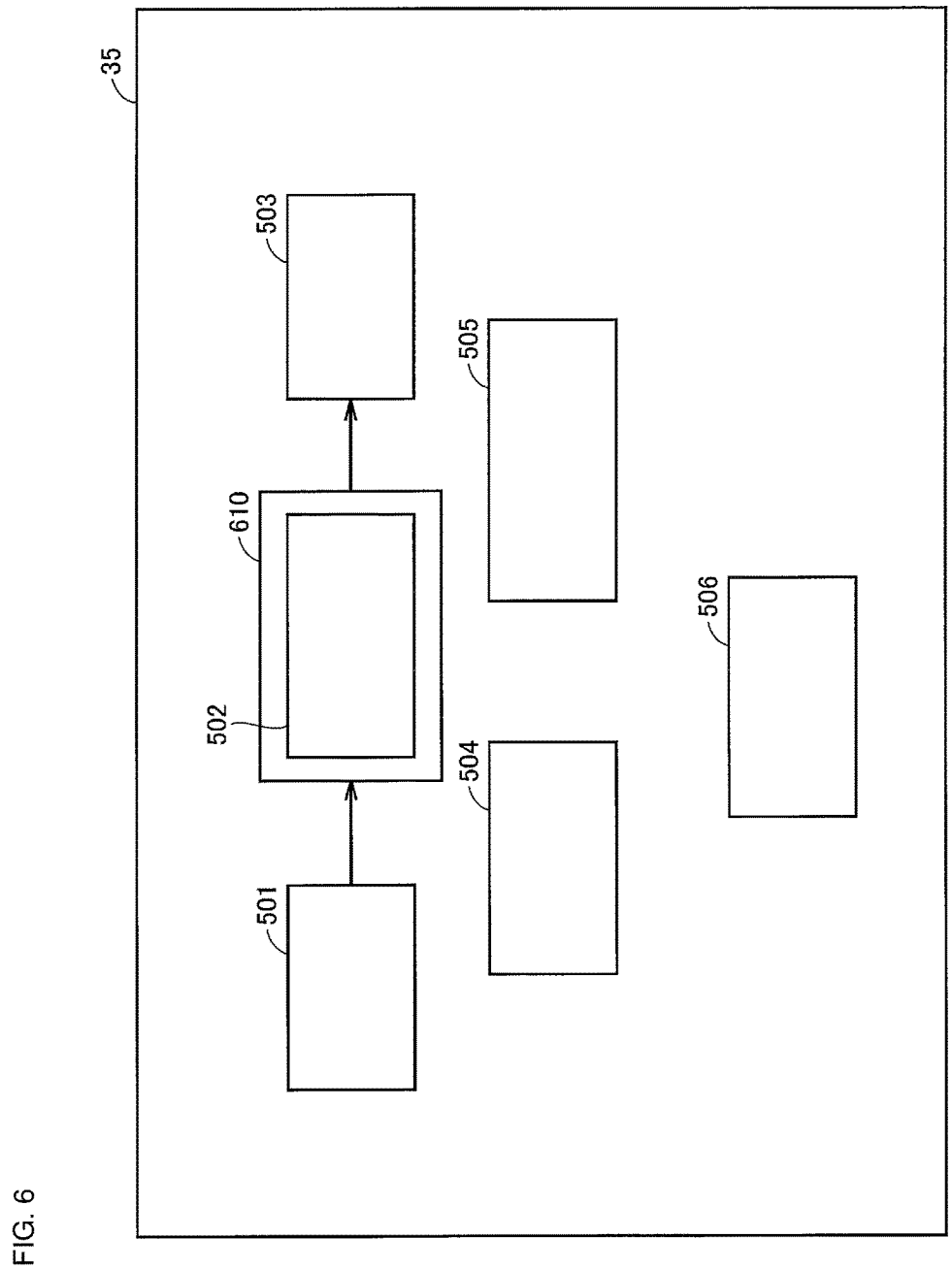
FIG. 6 is a (second) view illustrating how a focus is moved with respect to one or more user interface images 501 through 506 displayed on the display 35.

In another aspect of Embodiment 1, in a case where (i) a focus 610 is displayed so as to surround a user interface image 501 and (ii) a user presses, for example, the rightward movement key by operating the cursor movement key 120, the focus 610 is displayed so as to surround a user interface image 502 (see FIG. 6). If the user further continues to press the cursor movement key 120, then the focus 610 is sequentially moved in an order of a location of a user interface image 503, a location of a user interface image 504, a location of a user interface image 505, and a location of a user interface image 506. In a case where (i) the focus 610 is displayed on a location of the user interface image 506 and (ii) the user instructs the focus 610 to be further moved rightward by pressing the cursor movement key 120, the focus 610 is again displayed on a location of the user interface image 501. In a manner similar to the case where the rightward movement key of the cursor movement key 120 is operated, in a case where a left side button of the cursor movement key 120 is pressed in a state illustrated in FIG. 6, the focus 610 is displayed so as to surround the user interface image 501. In a case where the focus 610 is further instructed, via the cursor movement key 120, to move leftward, the focus 610 is moved from the location of the user interface image 501 to the location of the user interface image 506. Similarly, the focus 610 is sequentially moved in an order of the location of the user interface image 505, the location of the user interface image 504, the location of the user interface image 503, and the location of the user interface image 502.

Figure 7:
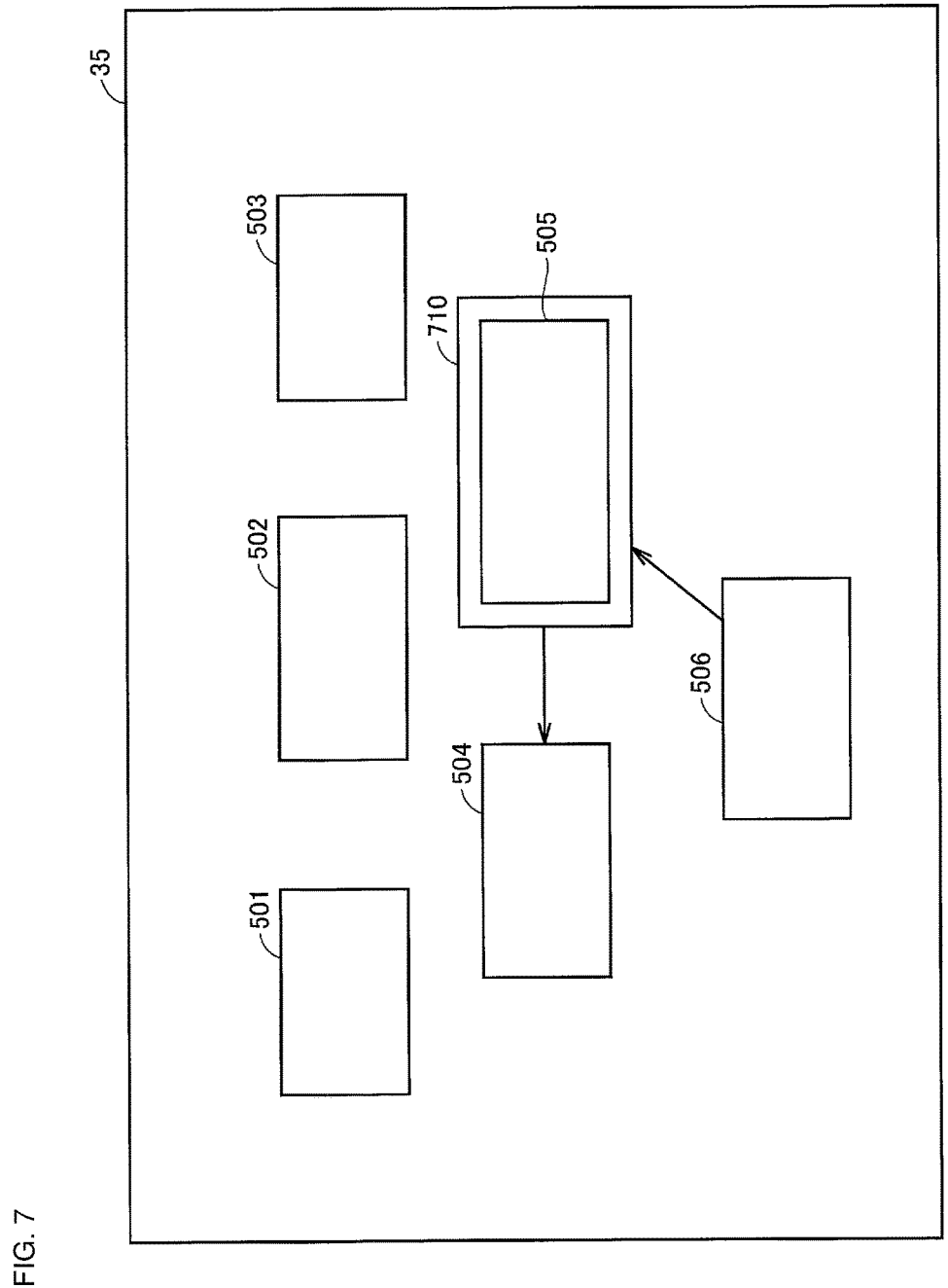
FIG. 7 is a view illustrating how a focus 710 moves in a case where a left key of a cursor movement key 120 is pressed.
Figure 8:
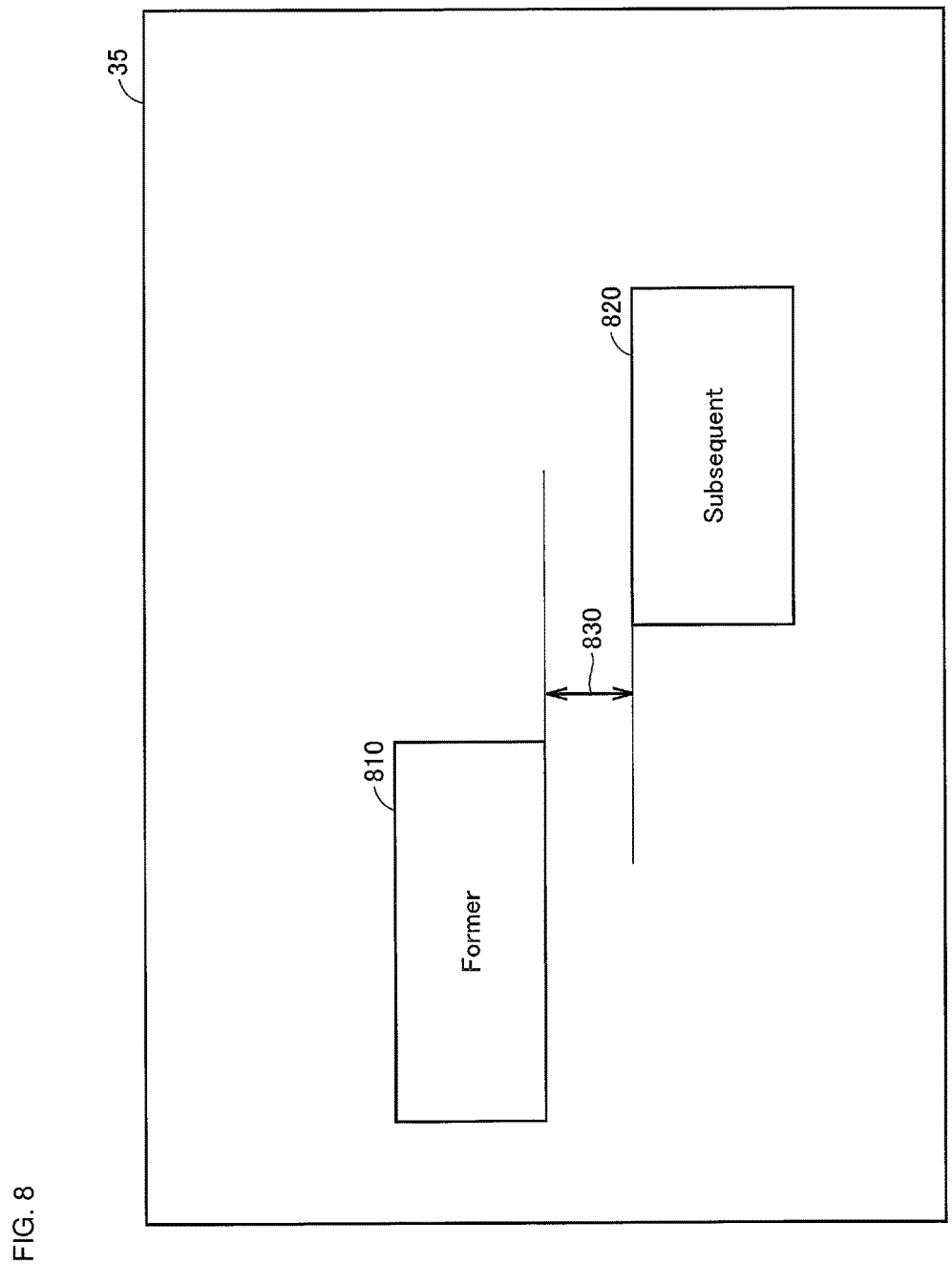
FIG. 8 is a (third) view illustrating how a focus is moved with respect to one or more user interface images 501 through 506 displayed on the display 35.

FIG. 7 is a view illustrating how a focus 710 moves in a case where a left key of the cursor movement key 120 is pressed. In a case where (i) the focus 710 is displayed so as to surround a user interface image 506 and (ii) a user presses the left key of the cursor movement key 120, the focus 710 is displayed so as to surround a user interface image 505. In a case where the user further presses the left key, the focus 710 is moved to a location of a user interface image 504. The focus 710 will be subsequently moved in a similar manner.

The following description will discuss an assignment rule to be used when the CPU 20 assigns numbers to respective user interface images. In an aspect of Embodiment 1, two user interface images 810 and 820 are displayed by the display 35 (see FIG. 8). In this aspect, the user interface image 810 is away from the user interface image 820 by a minimum distance 830 in a vertical direction. That is, one (the user interface image 810) of the user interface images is displayed completely above the other one (the user interface image 820) of the user interface images. In this situation, the CPU 20 assigns numbers to the respective user interface images 810 and 820 such that a former number is assigned to the user interface image 810 displayed on an upper side of the display 35 and a subsequent number is assigned to the user interface image 820 displayed on a lower side of the display 35.

Figure 9:
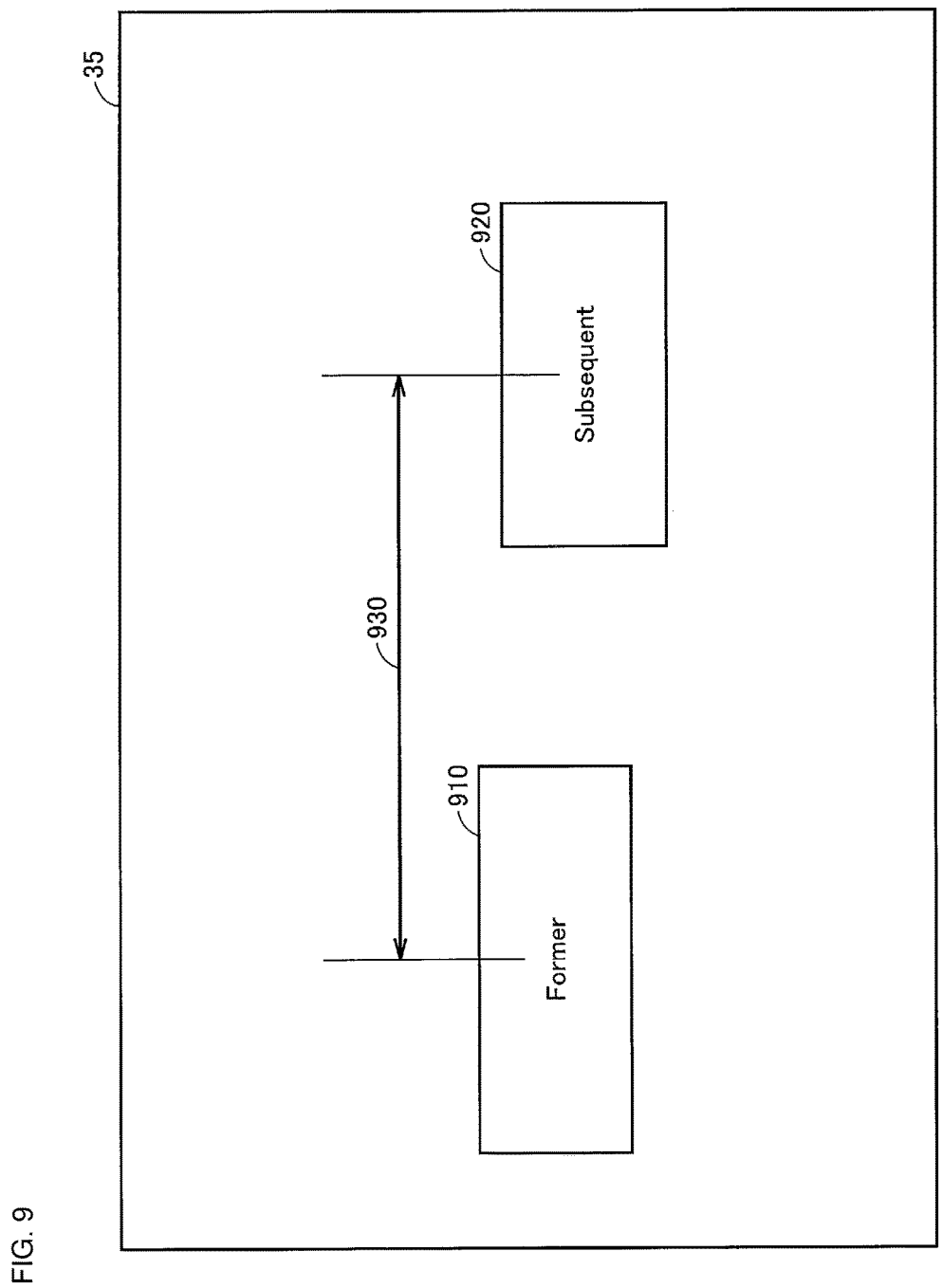
FIG. 9 is a (fourth) view illustrating how a focus is moved with respect to one or more user interface images 501 through 506 displayed on the display 35.

In another aspect of Embodiment 1, user interface images 910 and 920 are displayed on left and right sides of the display 35, respectively (see FIG. 9). In this aspect, a center point of the user interface image 910 is away, by a distance 930 in coordinates, from that of the user interface image 920. In this situation, the CPU 20 determines that the user interface image 910 is located on the left of the user interface image 920. Therefore, the CPU 20 assigns numbers to the respective user interface images 910 and 920 such that a former number is assigned to the user interface image 910 and a subsequent number is assigned to the user interface image 920.

Figure 10:
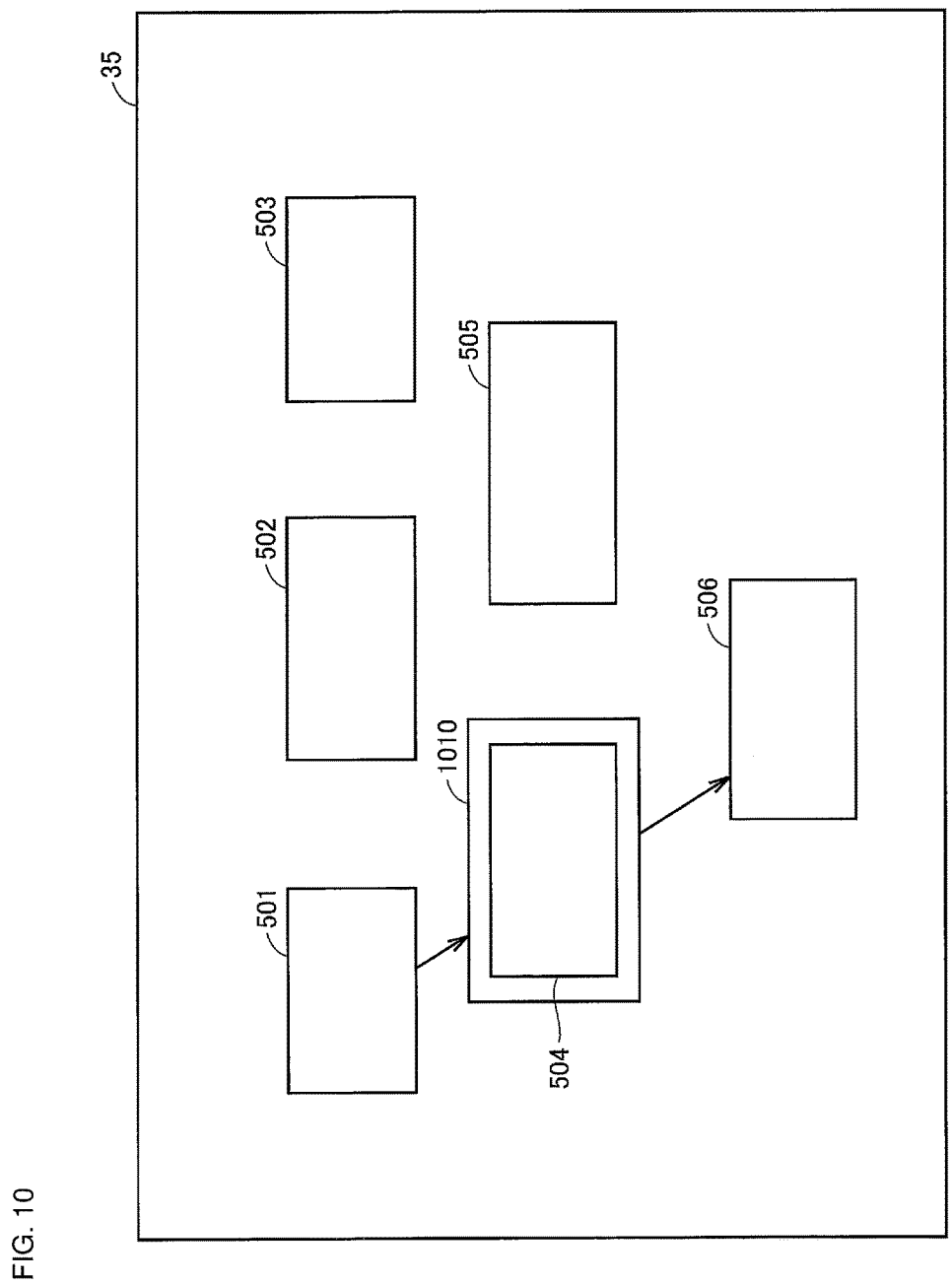
FIG. 10 is a (fifth) view illustrating how a focus is moved with respect to one or more user interface images 501 through 506 displayed on the display 35.

In still another aspect of Embodiment 1, there is a case where a user presses the up key or the down key of the cursor movement key 120 (see FIG. 10). For example, in a case where the user operates the down key, a focus 1010 is moved in an order of a location of a user interface image 501, a location of a user interface image 504, and a location of a user interface image 506. Specifically, in a case where the down key is pressed, the CPU 20 controls the focus to move to a location of a second user interface image from a location of a first user interface image, the second user interface image having second center coordinates which (i) are located lower than first center coordinates of the first user interface image and (ii) are nearest to the first user interface image. Note that, in a case where no user interface image is located lower than a current user interface image, the CPU 20 controls the focus 1010 to move to a location of a first user interface image. For example, the focus 1010, which has been moved in an order of the location of the user interface image 501, the location of the user interface image 504, and the location of the user interface image 506, is displayed again on the location of the user interface image 501, in response to a subsequent operation with respect to the down key. In a further aspect of Embodiment 1, in a case where (i) the down key is pressed while the focus 1010 is being displayed on a location of the user interface image 502 and (ii) the user interface image 505 is a user interface image having center coordinates which (i) are located lower than center coordinates of the user interface image 502 and (ii) are nearest to the user interface image 502, the focus 1010 is controlled to move from the location of the user interface image 502 to the location of the user interface image 505. The focus 1010 is further moved to the location of the user interface image 506 in response to pressing of the down key.

In still a further aspect of Embodiment 1, there is a case where the focus 1010 is displayed on the location of the user interface image 503. In such a case, when a user presses the down key, the focus 1010 is moved to the location of the user interface image 505. When the user further presses the down key, the focus 1010 is further moved to the location of the user interface image 506. Subsequently, in a case where the user further presses the down key, the focus 1010 is further moved to the location of the first user interface image (i.e., the user interface image 501).

Figure 11:
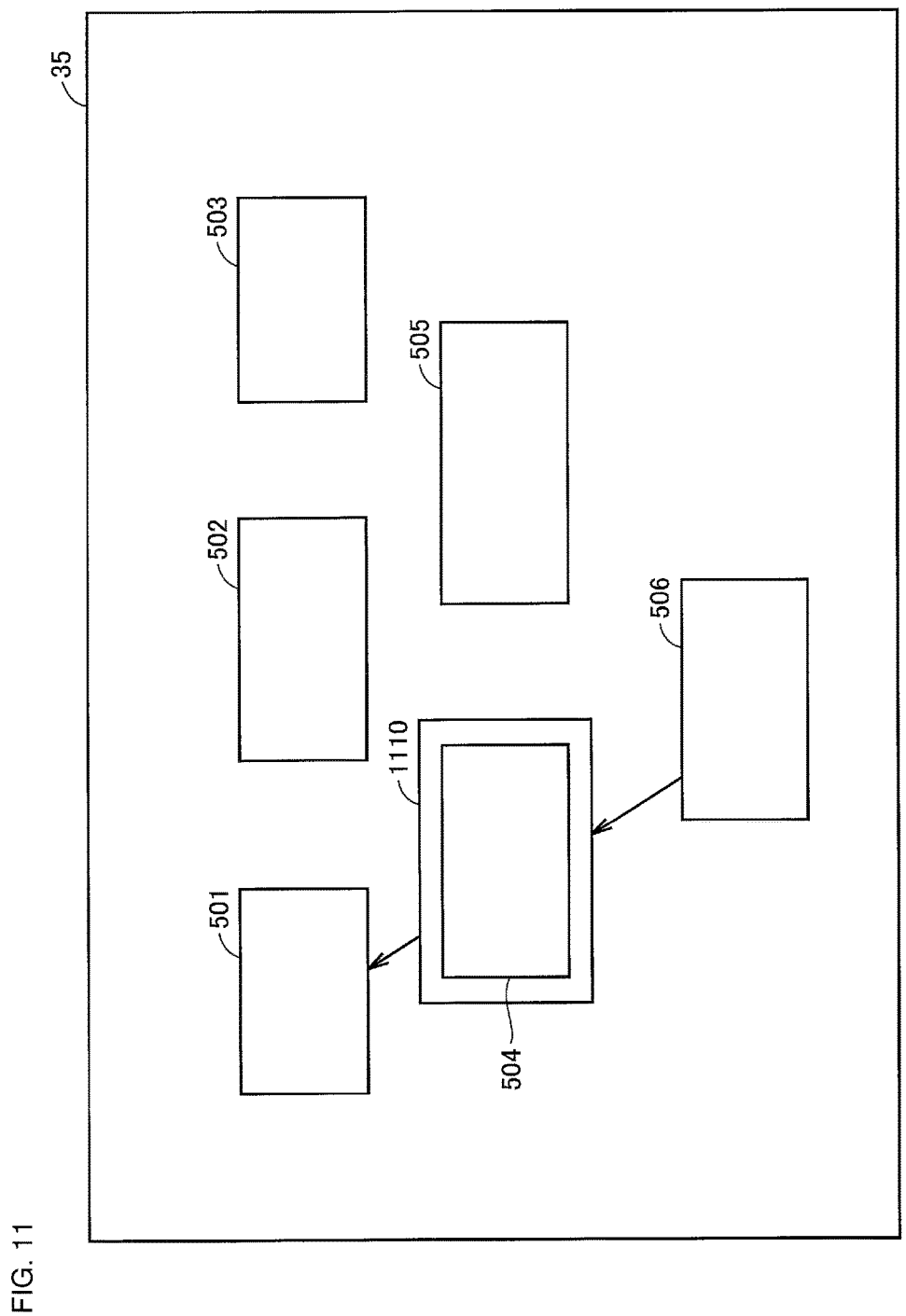
FIG. 11 is a (sixth) view illustrating how a focus is moved with respect to one or more user interface images 501 through 506 displayed on the display 35.

In another aspect of Embodiment 1, there is a case where a user sometimes wishes to move a focus upward from a location of a user interface image which is located down below a region in the display 35 (see FIG. 11). Specifically, in a case where the up key is pressed, the CPU 20 controls the focus to move to a location of a second user interface image from a location of a first user interface image, the second user interface image having second center coordinates which (i) are located higher than first center coordinates of the first user interface image and (ii) are nearest to the first user interface image. Note that in a case where no user interface image is located higher than a current focused user interface image, the CPU 20 controls a focus 1110 to move to a location of a last user interface image. For example, in a case where (i) the focus 1110 is displayed on a location of user interface image 506 and (ii) a user presses the up key of the cursor movement key 120, the focus 1110 is moved to a location of a user interface image 504. In a case where the user further presses the up key, the focus 1110 is further moved to a location of a user interface image 501. In this case, for example, in a case where a user wishes to move the focus 1110 to a location of a user interface image 502, it is possible to display the focus 1110 on the location of the user interface image 502, by pressing the right key of the cursor movement key 120 while the focus 1110 is being displayed on the location of the user interface image 501.

[Control Configuration]

Figure 12:
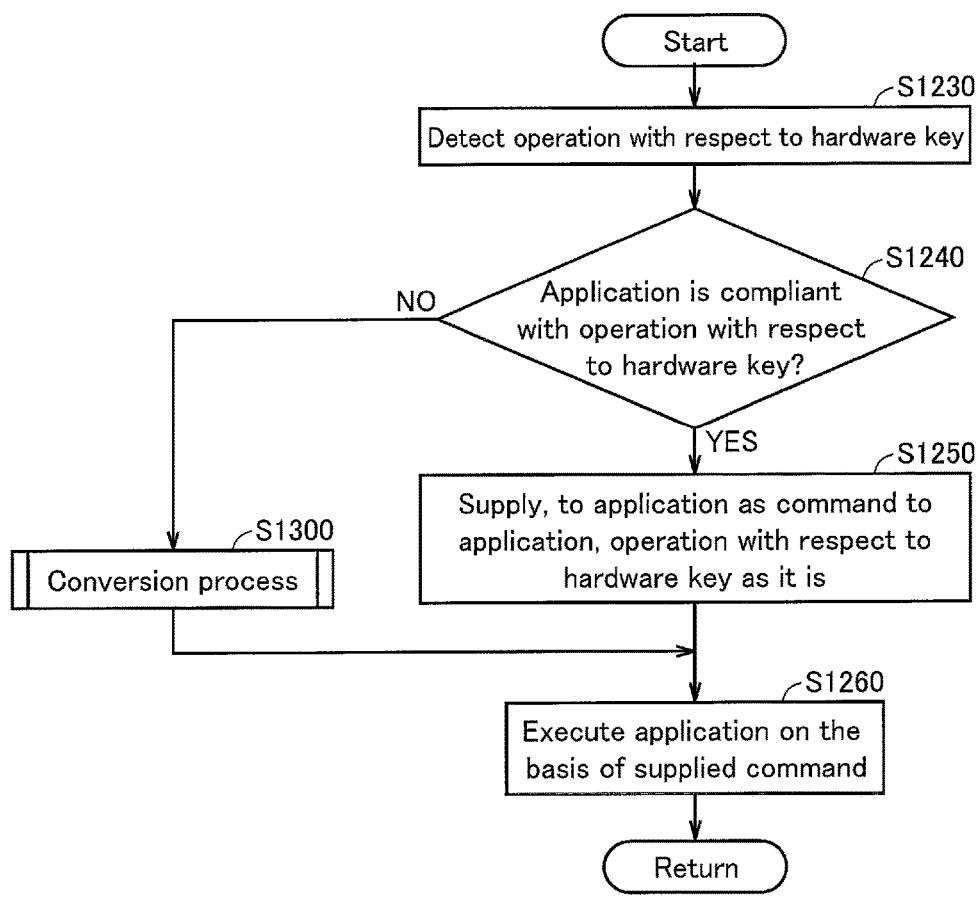
FIG. 12 is a (first) flow chart showing a part of a process which is carried out by a CPU 20 of the mobile phone 100.
Figure 13:
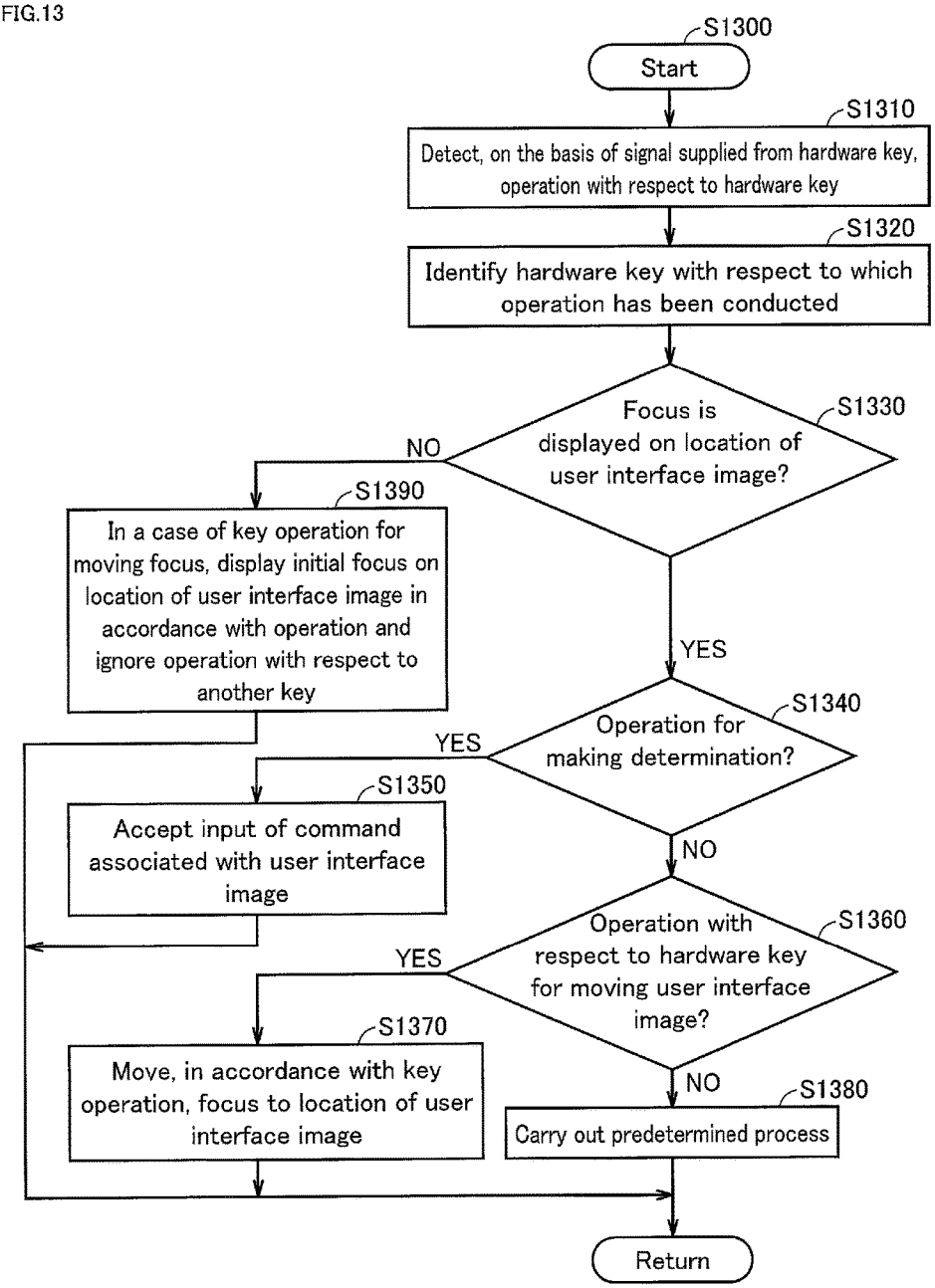
FIG. 13 is a (second) flow chart showing a part of a process which is carried out by the CPU 20 of the mobile phone 100.

The following description will discuss, with reference to FIGS. 12 and 13, a control configuration of the mobile phone 100 in accordance with Embodiment 1. FIGS. 12 and 13 are each a flow chart showing a part of a process which is carried out by the CPU 20 of the mobile phone 100.

The CPU 20 activates, on the basis of an operation conducted with respect to the hardware key 25, an application which is executable in an electronic device, such as a tablet terminal, including a touch panel.

The CPU 20 determines whether the application is compliant with an operation conducted with respect to the hardware key 25, and then stores, in a memory (e.g., the RAM 28), information indicative of a determination result. For example, the CPU 20 checks, with reference to the attribute information of the application, whether the application has data indicating that the application accepts an input other than input via a soft key, like the input via the hardware key 25. In a case where such data is contained in the attribute information, the CPU 20 determines that the application is compliant with an operation via the hardware key 25. After carrying out a process described above, the CPU 20 is in a state of waiting for an input operation to be conducted by a user with respect to the hardware key 25 or the like. The CPU 20 then carries out the process shown in FIG. 12, every time the CPU 20 detects an input operation.

In step S1230, the CPU 20 detects, on the basis of a signal supplied from the hardware key 25, an operation conducted with respect to the hardware key 25.

On the basis of the operation, conducted with respect to the hardware key 25, having been detected, the CPU 20 determines, in step S1240, whether an application is compliant with the operation conducted with respect to the hardware key 25. The CPU 20 makes such a determination, for example, on the basis of attribute information associated with the application. In a case where the CPU 20 has determined that the application is compliant with the operation conducted with respect to the hardware key 25 (i.e., YES in step S1240), the CPU 20 proceeds with step S1250. Otherwise (i.e., NO in step S1240), the CPU 20 proceeds with step S1300.

In step S1250, the CPU 20 supplies, to the application as a command to the application, the operation conducted with respect to the hardware key 25 as it is. For example, the CPU 20 considers that an operation for selecting an icon (a user interface image) contained in an image displayed on the display 35 has been conducted, and then supplies a corresponding command to the application.

In the step S1300, the CPU 20 carries out a conversion process (later described). In a case where the conversion process is carried out, the operation conducted with respect to the hardware key 25 is converted into an operation event with respect to the touch panel, and then the command thus converted is supplied to the application.

In step S1260, the CPU 20 executes the application on the basis of the command thus supplied.

(Conversion Process)

As shown in FIG. 13, in step S1310, the CPU 20 detects, on the basis of a signal supplied from the hardware key 25, an operation conducted with respect to the hardware key 25.

In step S1320, the CPU 20 identifies one of the keys of the hardware key 25 with respect to which one the operation has been conducted.

In step S1330, the CPU 20 determines whether a focus is displayed on a location of a user interface image. Specifically, the CPU 20 makes such a determination, for example, by comparing a coordinate value for displaying the focus with a coordinate value for displaying the user interface image. In a case where the CPU 20 has determined that the focus is displayed on the location of the user interface image (i.e., YES in step S1330), the CPU 20 proceeds with step S1340. Otherwise (i.e., NO in step S1330), the CPU 20 proceeds with step S1390.

In step S1340, the CPU 20 determines whether the operation is an operation for making a determination. The CPU 20 makes such a determination, for example, on the basis of whether an operation for making a determination is defined, in the application, as an operation conducted with respect to the user interface image. In a case where the CPU 20 has determined that the operation is the operation for making a determination (i.e., YES in step S1340), the CPU 20 proceeds with step S1350. Otherwise (i.e., NO in step S1340), the CPU 20 proceeds with step S1360.

In step the S1350, the CPU 20 accepts an input of a command associated with the user interface image.

In step S1360, the CPU 20 determines whether the operation is an operation conducted, with respect to a hardware key, for moving a focus to a location of a user interface image. For example, in a case where the CPU 20 has determined that the operation is the operation for moving the focus (i.e., YES in step S1360), the CPU 20 proceeds with step S1370. Otherwise (i.e., NO in step S1360), the CPU 20 proceeds with step S1380.

In step S1370, the CPU 20 controls the focus to move to a location of another user interface image in accordance with the operation conducted with respect to the hardware key. Subsequently, the process returns to a main process (FIG. 12).

In step S1380, the CPU 20 carries out a predetermined process. Subsequently, the process returns to the main process (FIG. 12).

In step S1390, in a case where the hardware key identified in the step S1320 is a key (e.g., the up key, the down key, the right key, the left key, etc.) configured to move the focus, the CPU 20 determines that a location of one of user interface images is an initial location, and then controls an initial focus to be displayed on the location of the one of user interface images. In a case where the hardware key identified in the step S1320 is not the key for moving the focus, the CPU 20 ignores the operation. Subsequently, the process returns to the main process (FIG. 12).

[How to Display Screen]

Figure 14:
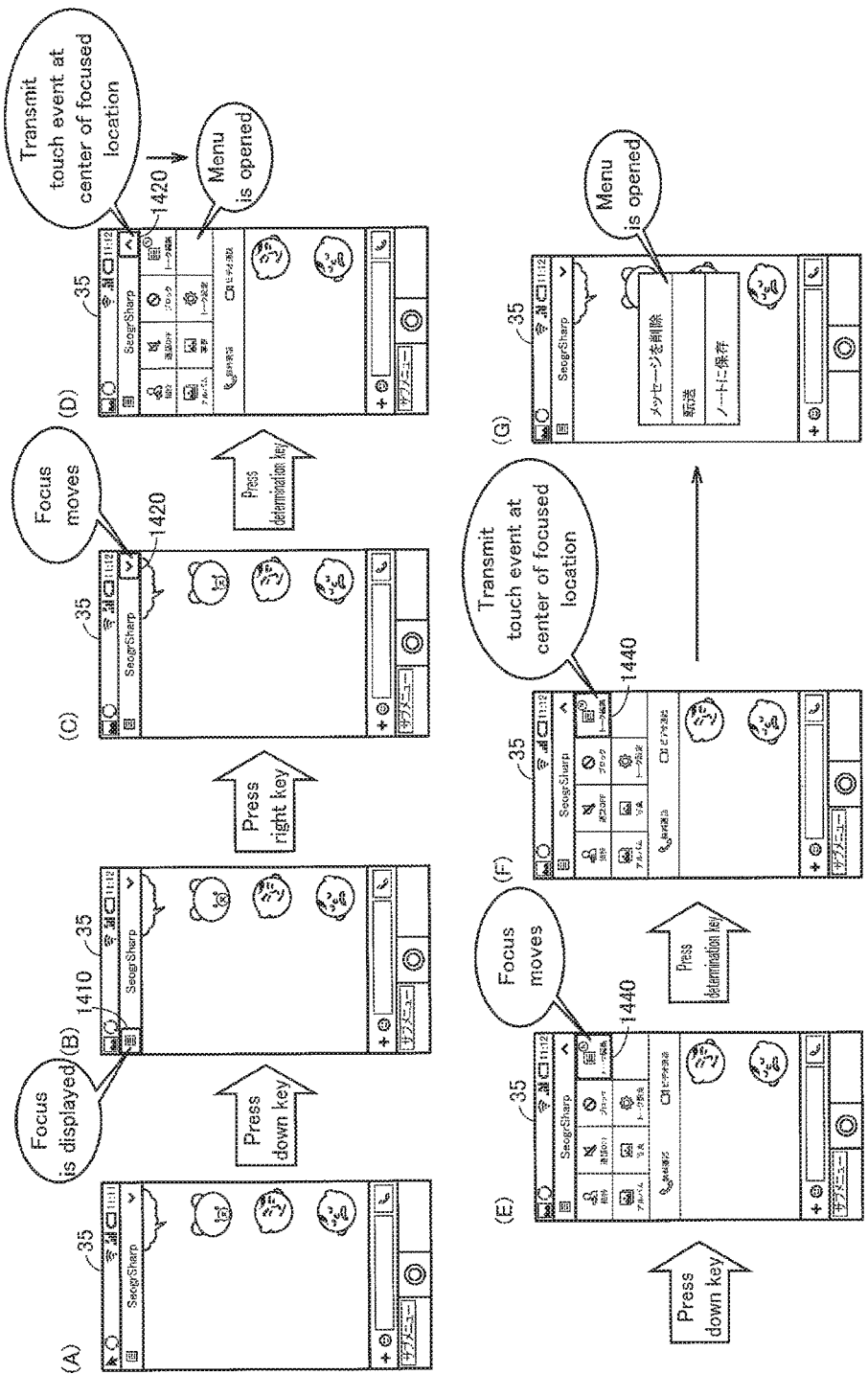
FIG. 14 is a view showing how images displayed on the display 35 change.

The following description will discuss, with reference to FIG. 14, how to display a screen of the mobile phone 100 in accordance with Embodiment. FIG. 14 is a view showing how images displayed on the display 35 change.

In an aspect of Embodiment 1, the mobile phone 100 displays a screen similar to that of a smartphone (see (A) of FIG. 14).

In a case where a user presses the down key of the cursor movement key 120, the display 35 displays a focus 1410 (see (B) of FIG. 14).

In a case where the user presses the right key of the cursor movement key 120, the focus moves as a focus 1420 (see (C) of FIG. 14).

In a case where the user presses the determination key 110, the display 35 displays, on a screen of an application which is being executed, for example, listing of functions in the screen on which the focus 1420 is displayed (see (D) of FIG. 14).

In a case where the user presses the down key of the cursor movement key 120, the focus is moved so that the display 35 displays a focus 1440 (see (E) of FIG. 14).

In a case where the user presses the determination key 110, a user interface image, where the focus 1440 is displayed, determines that a touch event has been received at a center of the location on which the focus 1440 is displayed (see (F) of FIG. 14). This causes the display 35 to display a message of the application (see (G) of FIG. 14).

<Embodiment 2>

The following description will discuss Embodiment 2. A hardware key 25 is composed of buttons, such as a numeric key, an asterisk (*) key, and a sharp (#) key, while buttons are provided on a housing. Note, however, that switches provided on a side surface of the housing can also realize the technical idea of Embodiment 2. For example, a button for increasing audio volume and a button for decreasing audio volume can be employed as Embodiment 2 to (i) move a focus 1010 and (ii) select a user interface image where the focus 1010 is to be displayed.

Note that a terminal device in accordance with Embodiment 2 is realized by using a configuration and a control configuration similar to those of the mobile phone 100 in accordance with Embodiment 1. Descriptions of such configuration and control configuration will not therefore be repeated.

<Embodiment 3>

The following description will discuss Embodiment 3. In an aspect of Embodiment 3, a single button can be employed to (i) move a focus 1010 and (ii) select a user interface image where a focus is to be displayed. For example, it is possible to realize, in accordance with a time period during which a button is being pressed, to move the focus 1010 or select a user interface image where a focus is to be displayed. For example, in a case where the button is "pressed and released", the focus 1010 is moved. In a case where the button is "pressed and held", a user interface image where a focus is to be displayed is selected. In this case, in a case where the button is "pressed and released" twice, the focus 1010 is moved twice in a predetermined direction (e.g., a right direction). In a case where the button is then "pressed and held" in a state above, a corresponding user interface image where the focus 1010 is to be displayed is selected.

Note that a hardware configuration of a terminal device in accordance with Embodiment 3 is realized by using the hardware configuration of the mobile phone 100 in accordance with Embodiment 1. Description of such a hardware configuration will not therefore be repeated.

For example, the terminal device in accordance with Embodiment 3 can be configured such that a single button has two or more types of input detection mechanisms configured to make it possible to input, to the terminal device, (i) a movement of the focus 1010 and (ii) the selection of a location of a user interface image on which location a focus is to be displayed. For example, in a case where a single button has (a) a first mechanism configured to accept a rotating operation of the button and (b) a second mechanism configured to accept pressing of the button, an input is accepted as below. Specifically, in a case where (i) the first mechanism accepts a rotating operation of the button conducted by a user, the focus 1010 is moved and (ii) the second mechanism accepts a pressing operation of the button conducted by the user, a user interface image where the focus 1010 is to be displayed is selected. Examples of such a button having the first mechanism and the second mechanism can include a button of wheel-type which accepts, by a disk-shaped mechanism of wheel-type, (i) a rotating operation of the button and (ii) a pressing operation of the button. Examples of such a button can alternatively encompass a button which includes a cylindrical member, such as a screw, having a rotation axis so as to accept (i) a rotating operation of the cylindrical member and (ii) a pressing operation of the cylindrical member by a user.

[Effects of Embodiments]

As has been described, according to Embodiments 1 through 3, a user can operate, via only a key input, an application which is not compliant with a key event. Even a user, who is not good at conducting a touch operation, can operate the application by conducting a key operation. Furthermore, since each application does not need to be compliant with a key event, burden of developing the each application will be reduced.

[Recapitulation]

The mobile phone 100 which is an example of a terminal device of each of Embodiments 1 through 3 has been described. The terminal device of each of Embodiments 1 through 3 is summarized as having the following configuration.

(1) A terminal device (mobile phone 100) is for executing an application (350) in accordance with an operation conducted by a user.

The application (350) is configured to be executed in accordance with an operation conducted with respect to a touch panel in an electronic device. The application (350) is configured such that, in a case where the application (350) is executed by the electronic device, the application (350) causes a display of the electronic device to display one or more user interface images each being configured to accept, via the touch panel, a command to the application (350).

The terminal device (mobile phone 100) includes: a housing (25); one or more operation keys (120) which are included in the housing (25) and are configured to accept a command inputted by a user with respect to the mobile phone 100; a memory (RAM 28) for storing therein the application (350); a monitor (display 35); a control section (CPU 20) configured to control an operation of the terminal device (mobile phone 100).

The control section (CPU 20) is configured such that, in a case where the application (350) is executed, the control section (CPU 20) controls the monitor (display 35) to display (i) one or more user interface images (501, 502, 503, 504, 505, 506) and (ii) a focus image (610) which indicates which one of the one or more user interface images (501, 502, 503, 504, 505, 506) has been selected.

The terminal device is configured such that, in a case where a plurality of user interface images (501, 502, 503, 504, 505, 506) are displayed on the monitor (display 35), a user interface image (501, 502, 503, 504, 505, 506) associated with the focus image (610) is switched in accordance with a first operation conducted with respect to one of the one or more operation keys (120).

(2) According to the configuration (1), the control section (CPU 20) is configured to determine, in accordance with a second operation conducted with respect to one of the one or more operation keys (120), a selection of a user interface image (501, 502, 503, 504, 505, 506) which is indicated, by the focus image (610), to have been selected.

(3) According to the configuration (1) or (2), the control section (CPU 20) is configured such that, in a case where the focus image (610) is associated with a last user interface image (506) of the plurality of user interface images (501, 502, 503, 504, 505, 506), the control section (CPU 20) associates the focus image (610) with a first user interface image (501) in accordance with the first operation conducted with respect to one of the one or more operation keys (120).

Note that the foregoing embodiments are disclosed as merely examples in terms of all points, and therefore should not be considered to limit the present invention. The scope of the present invention is intended to encompass not only the features described above but also all variations within the scope of the claims and equivalents of the claims.

REFERENCE SIGNS LIST

20: CPU
23: Antenna
24: Communication device
25: Hardware key
26: Camera
27: Flash memory
28: RAM
29: ROM
30: Memory card drive device
31: Memory card
32: Microphone
33: Loudspeaker
34: Audio signal processing circuit
35: Display
38: Vibrator
39: Acceleration sensor
100: Mobile phone
101, 102: Housing
110: Determination key
120: Cursor movement key
130: Numeric key
310: Key input section
320: Key input/touch input converting section
330: Touch input transmission section
340: Key input transmission section
350: Application

The invention claimed is:

1. A terminal device comprising:
one or more hardware keys configured to accept a command which is inputted to the terminal device;
a monitor configured to display one or more user interface images and a focus image, the focus image being used to accept an operation of determining a selection of one of the one or more user interface images; and
a control section configured to control an operation of the terminal device,
the monitor displaying a first user interface image and a second user interface image in a case where an application executed by the control section is configured to be executed in accordance with an operation conducted with respect to a touch panel in an electronic device, the first user interface image and the second user interface image each being configured to accept, via the touch panel, a command to the application,
the control section executing, in a case where attribute information of the application indicates that the application is not compliant with a key event that is an operation conducted with respect to the one or more hardware keys, a conversion process of converting the key event into a touch event that is an operation conducted with respect to the touch panel,
in the conversion process, the control section being configured such that, in a case where the focus image is associated with the first user interface image, the control section associates the focus image with the second user interface image in accordance with a first operation conducted with respect to one of the one or more hardware keys, to switch the focus image from the first user interface image to the second user interface image.

* * * * *